(12) United States Patent
Wutthinitikornkit et al.

(10) Patent No.: US 12,533,319 B2
(45) Date of Patent: Jan. 27, 2026

(54) DYNAMIC CLUSTERS OF ATOM PARTICLES ACTIVATED IN EXTRACELLULAR FLUID

(71) Applicant: Seawagen Research Institute Zhengzhou, Zhengzhou (CN)

(72) Inventors: Sookjai Wutthinitikornkit, Bangkok (TH); Yanee Wutthinitikornkit, Bangkok (TH); Yongsheng Qiu, Bangkok (TH)

(73) Assignee: Seawagen Research Institute Zhengzhou, Zhengzhou (CN)

( * ) Notice: Subject to any disclaimer, the term of this patent is extended or adjusted under 35 U.S.C. 154(b) by 839 days.

(21) Appl. No.: 17/600,208

(22) PCT Filed: Apr. 2, 2019

(86) PCT No.: PCT/IB2019/052696
§ 371 (c)(1),
(2) Date: Sep. 30, 2021

(87) PCT Pub. No.: WO2020/201812
PCT Pub. Date: Oct. 8, 2020

(65) Prior Publication Data
US 2022/0202715 A1 Jun. 30, 2022

(51) Int. Cl.
*A61K 9/16* (2006.01)

(52) U.S. Cl.
CPC .................. *A61K 9/1611* (2013.01)

(58) Field of Classification Search
CPC .... A61K 9/1611; A61K 9/5115; A61K 33/00; A61K 33/06; A61K 33/20; A61K 33/24; A61K 33/30; A61K 33/32; A61P 1/00
See application file for complete search history.

(56) References Cited

U.S. PATENT DOCUMENTS

| 7,651,770 | B2 | 1/2010 | Berkland et al. | |
|---|---|---|---|---|
| 2007/0172653 | A1 | 7/2007 | Berkland et al. | |
| 2008/0038552 | A1* | 2/2008 | Noack | A61K 45/06 422/236 |
| 2009/0053316 | A1 | 2/2009 | Berkland et al. | |
| 2009/0081295 | A1 | 3/2009 | Berkland et al. | |
| 2015/0147276 | A1 | 5/2015 | Ingber et al. | |

FOREIGN PATENT DOCUMENTS

| CN | 102499944 A | 6/2012 | |
|---|---|---|---|
| CN | 105363043 A | 3/2016 | |
| CN | 108079282 A | 5/2018 | |
| CN | 108273073 A | 7/2018 | |
| WO | 2007076295 A2 | 7/2007 | |
| WO | WO-2013185032 A1 * | 12/2013 | ........... A61K 38/482 |
| WO | 2015134620 A1 | 9/2015 | |

OTHER PUBLICATIONS

Nazari et al. "Facile Large-sclae synthesis of stable CuO nanoparticles" Mater. Res. Express 2018, 5, 045046. (Year: 2018).*
Joudeh et al. "Nanoparticle classification, physicochemical properties, characterization, and applications: a comprehensive review for biologists" Journal of Nanobiotechnology 2022, 20:262. (Year: 2022).*
Elmowafy et al. "Biocompatibility, biodegradation and biomedical applications of poly(lactic acid)/poly(lactic-co-glycolic acid) micro and nanoparticles" Journal of Pharmaceutical Investigation 2019, 49, 347-380 (Year: 2019).*
Bennett et al. "Photoinduced Disaggregation of TiO2 Nanoparticles Enables Transdermal Penetration" PLoS ONE 2012, 7(11), e48719 (Year: 2012).*
Williams et al. "Field-Flow Fractionation: Addressing the Nano-Challenge" Anal. Chem. 2011, 83, 634-642 (Year: 2011).*
International Search Report for International Application No. PCT/IB2019/052696 mailed Oct. 8, 2020.
Written Opinion of the International Searching Authority for International Application No. PCT/IB2019/052696 mailed Oct. 8, 2020.

* cited by examiner

*Primary Examiner* — Bethany P Barham
*Assistant Examiner* — Judith Marie Kamm
(74) *Attorney, Agent, or Firm* — Perilla Knox & Hildebrandt LLP; Kenneth A. Knox

(57) ABSTRACT

Provided herein are dynamic clusters of atom particles activated in extracellular fluid intended to reverse the accumulation of advanced glycation end products which are closely related to chronic diseases. The manufacturing process involves material preparation, particle fragmentation, pH adjustment, selection of atom particles and construction of dynamic clusters through electromagnetic field and flow velocity adjustment, and separation of dynamic clusters from the liquid. The dynamic clusters of atom particles deal with advanced glycation end products, which are diverse in chemical nature, by responding to irregularities in the electromagnetic field disrupted by highly reactive free radicals advanced glycation end products emit. Such mechanism makes it possible to extend the applications to diseases related to irregular free radical activities other than chronic diseases like in HIV replication or neural signalling.

8 Claims, 1 Drawing Sheet

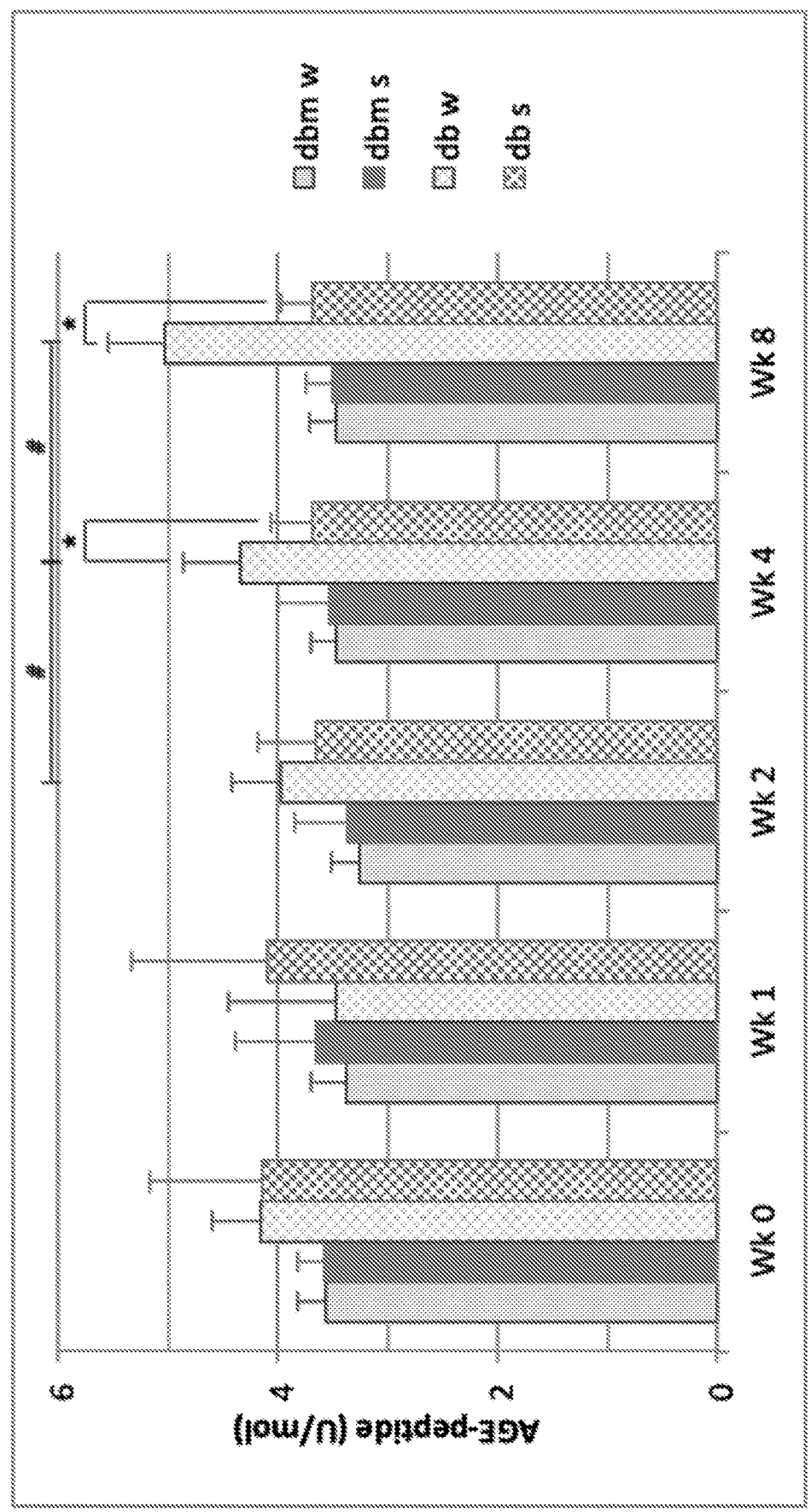

DYNAMIC CLUSTERS OF ATOM PARTICLES ACTIVATED IN EXTRACELLULAR FLUID

CROSS-REFERENCE TO RELATED APPLICATION

This disclosure is a national phase application under 35 U.S.C. 371 of International Application No. PCT/IB2019/052696 filed Apr. 2, 2019, entitled "DYNAMIC CLUSTERS OF ATOM PARTICLES ACTIVATED IN EXTRACELLULAR FLUID," the contents of which being incorporated by reference in their entireties herein.

TECHNICAL FIELD

The present disclosure relates to therapy of chronic diseases.

BACKGROUND

Chronic diseases have been recognized by the World Health Organization (WHO) as the leading causes of death and disability, and are expected to contribute approximately 73% of all deaths and 60% of the global burden of disease by 2020. The most prominent chronic diseases, including diabetes, cardiovascular diseases, chronic obstructive pulmonary disease, cancer, and so on, are in fact associated with extracellular fluid in the sense that it provides medium to transport the causal substances throughout the body.

Among the causal substances are nutrients. Through non-enzymatic reactions, proteins and/or lipids exposed to sugars become advanced glycation end products (AGEs). AGEs may form within the body or outside and then enter the body through diet. AGEs can be found in every part of the body, from those circulating in blood vessels, depositing in extracellular matrices to those within the cells. In general, the accumulation of AGEs is particularly high in long-living cells or extracellular molecules with low biological turnover. (Similarly, in red blood cells, which are rather short-living and have relatively high biological turnover, an early glycation product called glycated haemoglobin (HbA1 c) can be found along with Hb-AGE.) AGEs may alter the functions of systems within the body by disrupting molecular conformation. Their existence in blood vessels crucially contribute to diseases associated with the vasculature. Furthermore, they affect cell signaling, for instance, by impairing receptor recognition. These phenomena are significantly related to chronic diseases, and thus, to cure chronic diseases, tackling AGEs is inevitable.

Designing drugs to bind to AGEs is challenging, or even impracticable considering that AGEs are essentially a class of compounds of diverse chemical nature. AGEs, nevertheless, are formed through similar sequences of reactions which generate free radicals. The processes through which AGEs cause harm to the body likewise generate free radicals. Free radicals feature high reactivity which enables them to easily bind and cause damages to molecules around them. The present disclosure provides a solution by proposing a method to construct dynamic clusters of atom particles which are activated at body temperature, such that atom particles would detach from the clusters in response to irregularities caused by highly reactive free radical in the field. Such property makes the present disclosure applicable to causal substances of various chemical nature.

BRIEF SUMMARY

The present disclosure proposes a method to construct dynamic clusters of atom particles which are activated at body temperature in extracellular fluid. The process involves material preparation, particle fragmentation, pH adjustment, selection of multiple atoms which possess a wide range of unique intrinsic properties and construction of dynamic clusters from selected atoms through electromagnetic field and flow velocity adjustment.

The dynamic clusters output by the method possess the following properties:
(1) (mobility) The clusters must be small enough to flow through capillaries to approach sites in the body where free radicals are highly reactive.
(2) (variety of elements) The clusters must contain various elements to offer a wide range of intrinsic properties, including mass, size, and angular momentum, to appropriately respond to highly reactive free radicals at each site.
(3) (loosely clustered) The clusters are loose such that the constituent atom particles can be easily detached from the clusters at body temperature. Being minuscule, the detached atom particles may move through obstacles swiftly to the sites where free radicals are highly reactive.
(4) (inert) Other than acting in response to highly reactive free radicals, the clusters as well as their constituent atom particles do not actively bind to any molecules in the body.

The AGEs deposited have insulator-like interior which blocks signal transmission and conductive surface exposed to body fluid. The atom particles detached themselves from the dynamic clusters in response to the irregularities caused by the highly reactive free radicals. The detached atom particles, at the appropriate frequencies, become entangled with the AGEs which emit free radicals, separating sugars while disintegrating the rest layer by layer to restore the functions of systems in the body, e.g. mechanisms to trigger and secrete insulins in beta cells. A possible consequence is a rise in blood sugar level, but as the AGEs hindering insulin secretion and function are eliminated, these sugars become usable, e.g. through exercises.

Since the output is designed to target free radicals, it is possible to extend its applications to diseases related to irregular free radical activities, other than chronic diseases.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 is a bar chart showing the concentration of AGE peptide in blood samples drawn from diabetic (db) and non-diabetic (dbm) mice, treated with dynamic clusters of atom particles (s) and control (w), over a period of 8 weeks.

DETAILED DESCRIPTION

The following details describe the process of constructing the dynamic clusters of atom particles activated in extracellular fluid.

Material Preparation:

The output of this step is water-based liquid containing various elements in ratios depending on the applications of the resulting product. The initial material may be any water-based liquid, including plant extract, animal extract or electrolyte. Any liquid contaminant immiscible in water such as oil must be removed without drastic temperature change. After that, any precipitated substances must be removed, by phase separation or filtration. Should the initial material lack some of the required elements, additives preferably water-soluble or nanoparticles may be added as appropriate. Note that additives must be carefully selected to ensure that they do not produce any toxic in particle fragmentation. Sediment larger than 50 micrometer, if there is any, should be removed by filtration.

Particle Fragmentation:

In this step, we expose the liquid obtained from the previous step to sunlight to trigger particle fragmentation to some extent. After that, we apply ultrasonic vibration to further shatter the particles into finer bits.

PH Adjustment:

The pH level of the material should also be adjusted by adding calcium hydroxide or hydrochloric acid as appropriate. Ideally the pH level should be 7.0-7.8.

From this point onward, the material will be processed at temperatures below the body temperature.

Selection of Atom Particles and Construction of Dynamic Clusters:

The steps to select and assemble atom particles into dynamic clusters are almost inseparable. They both occur through manipulation of electromagnetic field to mimic that produced by highly reactive free radicals. Particles in the liquid regardless of their charge and polarity can be propelled by nonuniform electromagnetic field. However, each atom particle has intrinsic properties (mass, size, and angular momentum) and each responds to the force field differently. Therefore, the contents of the liquid would yield unique assembly of atom particles. Liquid flow velocity is adjusted to control the behaviors of the particles in the liquid as they flow across the nonuniform electromagnetic field. As the dynamic clusters are formed in the liquid, the liquid turns into white colloidal suspension.

Separation of Dynamic Clusters from the Liquid:

In this step, we separate the dynamic clusters from the colloidal suspension by sprinkling the suspension over a smooth-surfaced water-permeable sheet. Some water molecules are removed when the suspension is sprinkled for water is more volatile. Another large portion of water, as well as particles that are not part of the clusters, is removed as water seeps through the water-permeable sheet. We then have the slightly moist dynamic clusters on top of the water-permeable sheet in form of opaque white slurry.

The process of constructing the dynamic clusters of atom particles activated in extracellular fluid according the present disclosure yields the dynamic clusters in form of opaque white slurry. The dynamic clusters are to be diluted in drinking water at temperatures below 305 K to allow the dynamic clusters to enter the bloodstream through the wall of gastrointestinal tract. A rise in temperature (to 310 K) activates the function of the dynamic clusters. The dimension of each cluster is small enough to pass through the capillaries (8 micrometers in diameter), allowing the cluster to approach the sites of highly reactive free radicals. There, compatible atom particles detached from the clusters in response to the irregularities in the electromagnetic field disrupted by the radicals. The detached atom particles get entangled with the radicals to inactivate them, and with no other molecules in the system.

The dynamic clusters according to the present disclosure customized for dealing with the AGEs are manufactured from the solution with the following main contents:

| Content | Concentration (g/l) |
| --- | --- |
| Chlorine | 12.5604 |
| Sodium | 6.8786 |
| Magnesium | 0.8232 |
| Calcium | 0.2638 |
| Potassium | 0.2566 |
| Zinc | 0.1159 |
| Strontium | 0.0644 |
| Manganese | 0.0406 |

The concentrations specified in the table are subject to 3% error. The output dynamic clusters range from 3.5-4.5 nm in diameter.

The AGEs deposited have insulator-like interior which blocks signal transmission; in type 2 diabetes, they hinder insulin secretion and function. By separating sugars from the AGEs and disintegrating the rest layer by layer, the functions of systems in the body are restored. FIG. 1 shows the concentration of AGE peptide in blood samples drawn from diabetic (db) and non-diabetic (dbm) mice, treated with dynamic clusters of atom particles (s) and control (w), over a period of 8 weeks. As AGE peptide in the diabetic group treated with control (db w) continues to elevate, AGE peptide in the diabetic group treated with the dynamic clusters of atom particles according to the present disclosure (db s) lowers to a level on par with the non-diabetic groups (dbm *). This shows that the formation of AGEs is reversible.

The process of constructing the dynamic clusters of atom particles activated in extracellular fluid according to the present disclosure may be modified and altered within the scope of the disclosure.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A process of manufacturing clusters of atom particles, comprising:
   a. performing a material preparation, wherein the material preparation comprises processing a liquid, the liquid comprising at least one of plant extract, animal extract, or an electrolyte, by:
      removing liquid contaminants immiscible in the liquid, wherein the liquid contaminants are at least oil particles; and
      removing precipitated substances by phase separation or filtration from the liquid;
   b. performing a particle fragmentation;
   c. performing a pH adjustment, wherein the pH adjustment comprises adding calcium hydroxide or hydrochloric acid to the liquid to adjust pH level to 7.0-7.8;
   d. performing a selection of atom particles and construction of clusters, wherein the selection of atom particles and construction of clusters are processed at temperatures below 310K,
      wherein the selection of atom particles and construction of clusters comprises manipulating an electromagnetic field and providing a liquid flow velocity to control behaviors of particles in the liquid as the particles flow across a non-uniform electromagnetic field that turns a clear liquid into a colloidal suspension, wherein the particles in the liquid regardless of their charge and polarity are propelled by the non-uniform electromagnetic field, wherein the liquid comprises 12.5604 g/l of chlorine, 6.8786 g/l of sodium, 0.8232 g/l of magnesium, 0.2638 g/l of calcium, 0.2566 g/l of potassium, 0.1159 g/l of zinc, 0.0644 g/l of strontium, and 0.0406 g/l of manganese; and e. performing a separation of the clusters.

2. The process of manufacturing dynamic clusters of atom particles according to claim 1, wherein performing the material preparation comprises using non-toxic additives to supplement contents of the liquid; and filtering out sediment larger than 50 micrometers from the liquid.

3. The process of manufacturing clusters of atom particles according to claim 1, wherein performing the particle fragmentation comprises exposing the liquid to sunlight and applying ultrasonic vibration to fragment particles smaller than 50 micrometers into finer bits.

4. The process of manufacturing clusters of atom particles according to claim 1, wherein performing the separation of the clusters comprises sprinkling the colloidal suspension over a water-permeable sheet, thereby leaving the clusters in a form of an opaque white slurry on a surface of the water-permeable sheet.

5. A cluster of atom particles obtained by the process of manufacturing clusters of atom particles according to claim 1.

6. The cluster of atom particles according to claim 5, wherein the cluster is small enough to flow through capillaries 8 micrometers in diameter.

7. The cluster of atom particles according to claim 5, wherein constituent particles of the cluster are detachable at body temperature.

8. The cluster of atom particles according to claim 5, wherein the cluster is capable of reversing an accumulation of advanced glycation end products.

* * * * *